United States Patent
McCune et al.

(10) Patent No.: US 8,297,916 B1
(45) Date of Patent: Oct. 30, 2012

(54) FLEXIBLE SUPPORT STRUCTURE FOR A GEARED ARCHITECTURE GAS TURBINE ENGINE

(75) Inventors: Michael E. McCune, Colchester, CT (US); Jason Husband, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/342,508

(22) Filed: Jan. 3, 2012

Related U.S. Application Data

(60) Provisional application No. 61/494,453, filed on Jun. 8, 2011.

(51) Int. Cl.
*F01D 15/12* (2006.01)
(52) U.S. Cl. .................. 415/124.1; 415/124.2
(58) Field of Classification Search .......... 60/223, 60/226.1; 415/9, 68, 122.1, 124.2, 119, 124.1; 416/500; 700/280
See application file for complete search history.

(56) References Cited

U.S. PATENT DOCUMENTS

| | | | |
|---|---|---|---|
| 5,433,674 A * | 7/1995 | Sheridan et al. | 475/346 |
| 6,073,439 A * | 6/2000 | Beaven et al. | 60/223 |
| 6,223,616 B1 * | 5/2001 | Sheridan | 74/468 |
| 6,663,530 B2 | 12/2003 | Poulin et al. | |
| 6,735,954 B2 | 5/2004 | MacFarlane et al. | |
| 6,855,089 B2 | 2/2005 | Poulin et al. | |
| 6,895,741 B2 | 5/2005 | Rago et al. | |
| 7,104,918 B2 | 9/2006 | Mitrovic | |
| 7,144,349 B2 | 12/2006 | Mitrovic | |
| 7,223,197 B2 | 5/2007 | Poulin et al. | |
| 7,704,178 B2 * | 4/2010 | Sheridan et al. | 475/159 |
| 7,841,163 B2 | 11/2010 | Welch et al. | |
| 7,841,165 B2 * | 11/2010 | Orlando et al. | 60/204 |
| 7,926,260 B2 * | 4/2011 | Sheridan et al. | 60/226.1 |
| 7,959,532 B2 * | 6/2011 | Suciu et al. | 475/331 |
| 8,172,717 B2 | 5/2012 | Lopez et al. | |
| 2010/0105516 A1 * | 4/2010 | Sheridan et al. | 475/346 |
| 2011/0106510 A1 * | 5/2011 | Poon | 703/2 |

* cited by examiner

*Primary Examiner* — Ninh H Nguyen
*Assistant Examiner* — Liam McDowell
(74) *Attorney, Agent, or Firm* — Carlson, Gaskey & Olds PC

(57) ABSTRACT

A geared architecture with a flex mount for a Fan Drive Gear System defined by a lateral stiffness relationship.

28 Claims, 6 Drawing Sheets

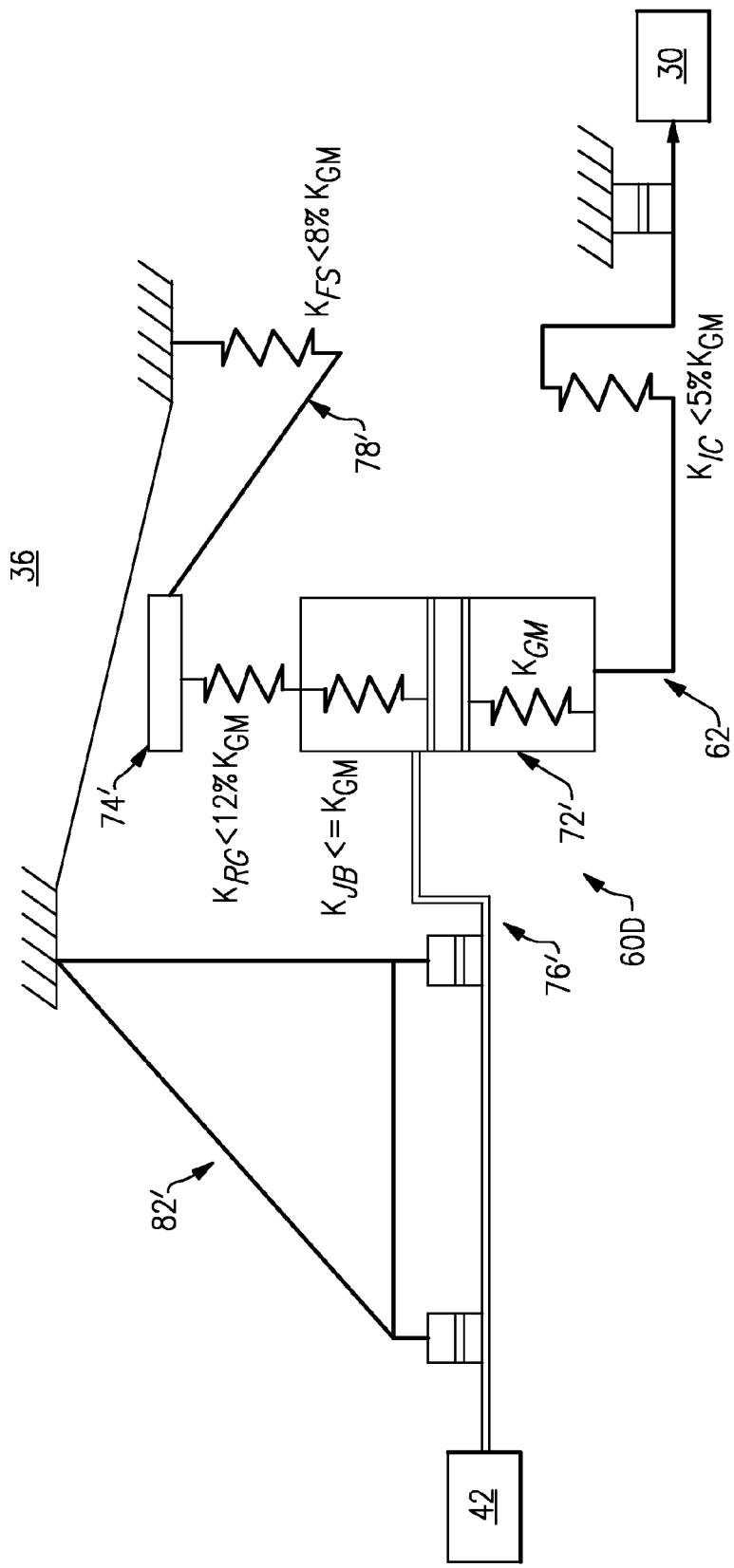

US 8,297,916 B1

FLEXIBLE SUPPORT STRUCTURE FOR A GEARED ARCHITECTURE GAS TURBINE ENGINE

The present disclosure claims priority to U.S. Provisional Patent Application No. 61/494,453, filed on Jun. 8, 2011.

BACKGROUND

The present disclosure relates to a gas turbine engine, and more particularly to a flexible support structure for a geared architecture therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the powerplant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

SUMMARY

A geared architecture for a gas turbine engine according to an exemplary embodiment of the present disclosure includes, among other possible things, a frame which supports a fan shaft, a gear system which drives the fan shaft, a flexible support, and an input coupling to the gear system. The frame defines a frame lateral stiffness (Kframe). The flexible support, which at least partially supports the gear system, defines a flexible support lateral stiffness (KFS) with respect to the frame lateral stiffness (Kframe). The input coupling defines an input coupling lateral stiffness (KIC) with respect to the lateral stiffness (Kframe).

In a further embodiment of the foregoing geared architecture embodiment, the frame and the flexible support may be mounted to a static structure.

In a further embodiment of either of the foregoing geared architecture embodiments, the frame and the flexible support may be mounted to a static structure of a gas turbine engine.

In a further embodiment of any of the foregoing geared architecture embodiments, the frame and the flexible support may be mounted to a front center body of a gas turbine engine.

In a further embodiment of any of the foregoing geared architecture embodiments, the flexible support may be mounted to a planet carrier of the gear system. Additionally or alternatively, the input coupling may be mounted to a sun gear of the gear system. Additionally or alternatively, the fan shaft may be mounted to a ring gear of the gear system. Additionally or alternatively, the gear system may be a star system.

In a further embodiment of any of the foregoing geared architecture embodiments, the flexible support may be mounted to a ring gear of the gear system. Additionally or alternatively, the input coupling may be mounted to a sun gear of the gear system. Additionally or alternatively, the fan shaft may be mounted to a planet carrier of the gear system. Additionally or alternatively, the gear system may be a planet system.

In a further embodiment of any of the foregoing geared architecture embodiments, the geared architecture may additionally include a low speed spool which drives the input coupling.

In a further embodiment of any of the foregoing geared architecture embodiments, at least one of the flexible support lateral stiffness (KFS) and the input coupling lateral stiffness (KIC) may be less than about 20% of the frame lateral stiffness (Kframe).

In a further embodiment of any of the foregoing geared architecture embodiments, the flexible support lateral stiffness (KFS) and the input coupling lateral stiffness (KIC) may each be less than about 20% of the frame lateral stiffness (Kframe).

In a further embodiment of any of the foregoing geared architecture embodiments, at least one of the flexible support lateral stiffness (KFS) and the input coupling lateral stiffness (KIC) may be less than about 11% of the frame lateral stiffness (Kframe).

In a further embodiment of any of the foregoing geared architecture embodiments, the flexible support lateral stiffness (KFS) and the input coupling lateral stiffness (KIC) may each be less than about 11% of the frame lateral stiffness (Kframe).

A geared architecture for a gas turbine engine according to another exemplary embodiment of the present disclosure includes a frame which supports a fan shaft, a gear system which drives the fan shaft, a flexible support, and an input coupling to the gear system. The gear system includes a gear mesh that defines a gear mesh lateral stiffness (KGM). The flexible support, which at least partially supports the gear system, defines a flexible support lateral stiffness (KFS) with respect to the gear mesh lateral stiffness (KGM). The input coupling defines an input coupling lateral stiffness (KIC) with respect to the gear mesh lateral stiffness (KGM).

In a further embodiment of this geared architecture embodiment, the flexible support lateral stiffness (KFS) may be less than about 8% of the gear mesh lateral stiffness (KGM).

In a further embodiment of either of the foregoing geared architecture embodiments, the input coupling lateral stiffness (KIC) may be less than about 5% of the gear mesh lateral stiffness (KGM).

In a further embodiment of any of the foregoing geared architecture embodiments, a lateral stiffness (KRG) of a ring gear of the gear system may be less than about 20% of the gear mesh lateral stiffness (KGM).

In a further embodiment of any of the foregoing geared architecture embodiments, a lateral stiffness (KRG) of a ring gear of the gear system may be less than about 12% of the gear mesh lateral stiffness (KGM).

In a further embodiment of any of the foregoing geared architecture embodiments, a lateral stiffness (KJB) of a planet journal bearing which supports a planet gear of the gear system may be less than or equal to the gear mesh lateral stiffness (KGM).

In a further embodiment of any of the foregoing geared architecture embodiments, the gear mesh lateral stiffness (KGM) may be defined between a sun gear and a multiple planet gears of the gear system.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 is a schematic view of a flex mount arrangement for another non-limiting embodiment of a planetary system FDGS.

DETAILED DESCRIPTION

Figure 1:
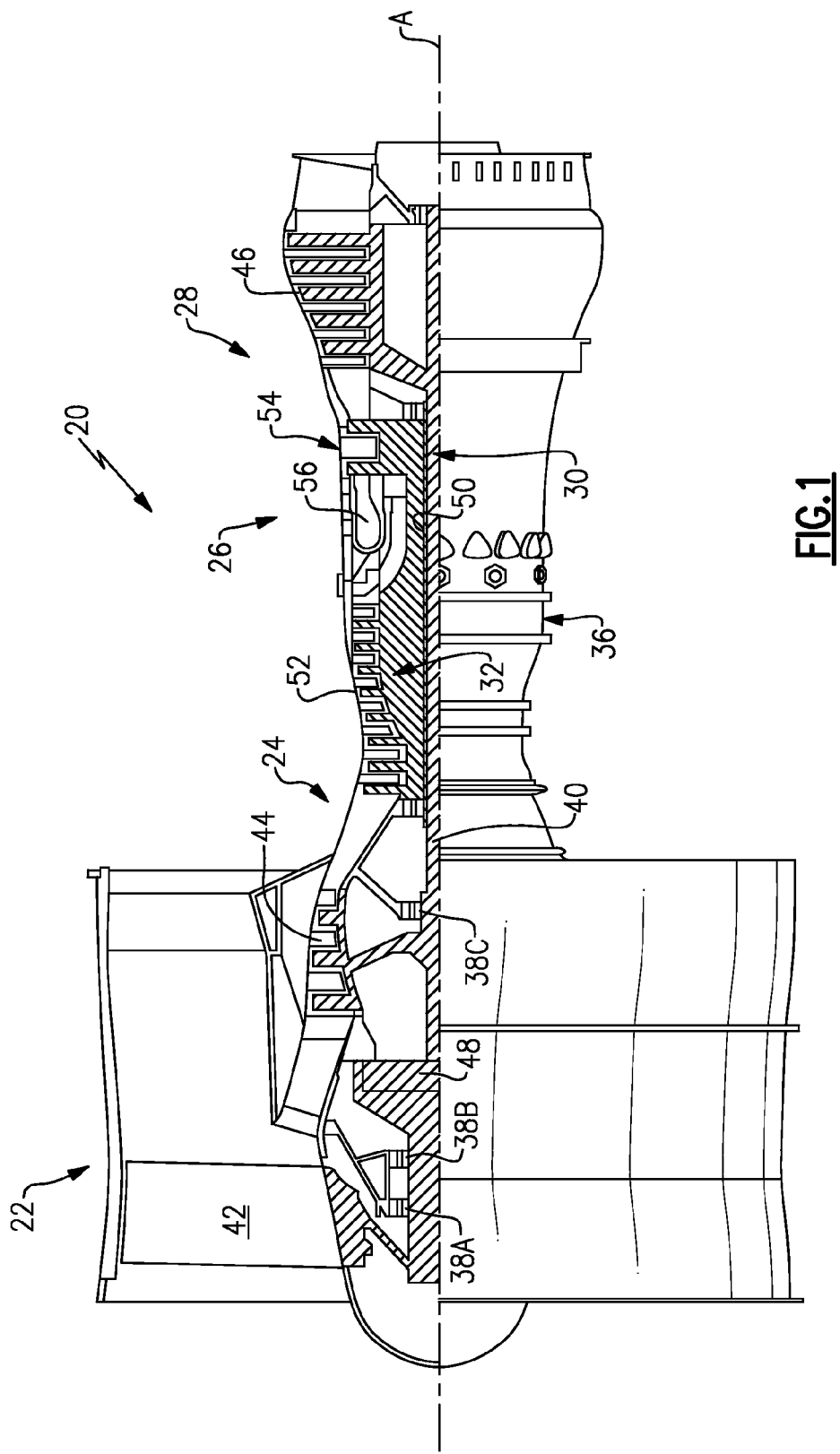
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool architecture gas turbine engine and an open rotor (unducted fan) engine.

The engine 20 generally includes a low speed spool 30 and a high speed spool 32 mounted for rotation about an engine central longitudinal axis A relative to an engine static structure 36 via several bearing systems 38A-38C. It should be understood that various bearing systems at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion of the airflow passing therethrough.

Figure 2:
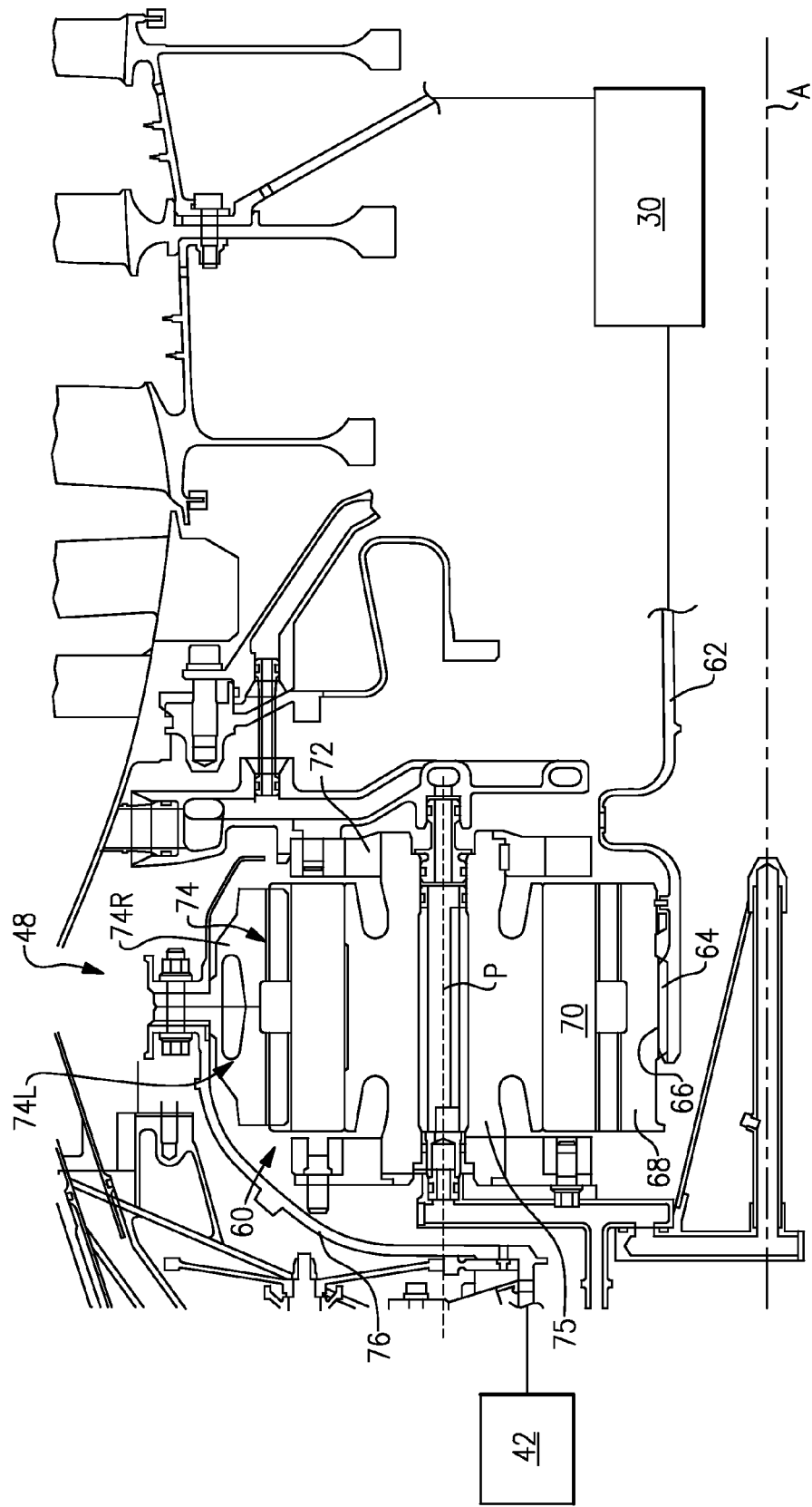
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input coupling 62. The input coupling 62 both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
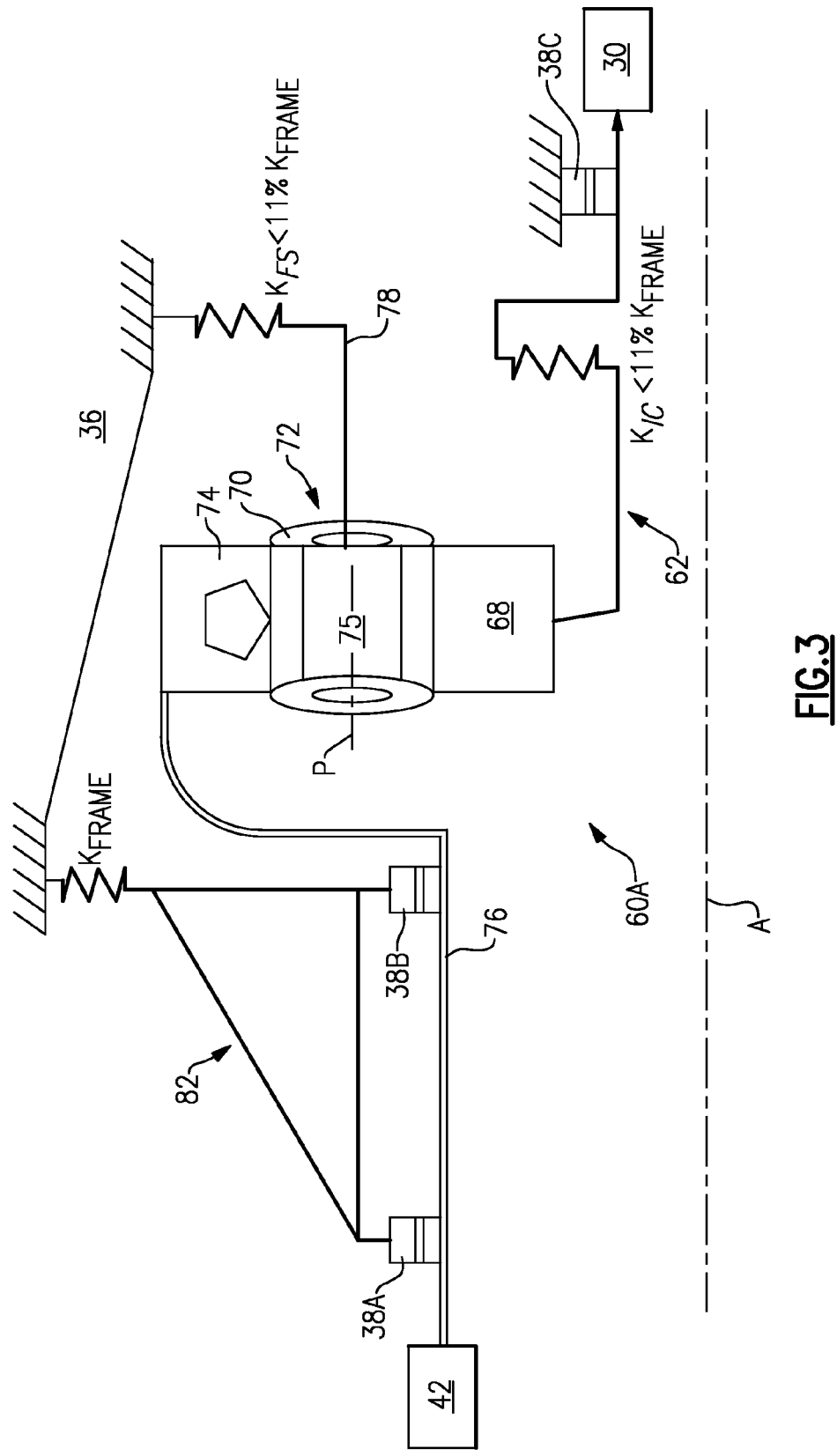
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It should be understood that lateral as defined herein is generally transverse to the axis of rotation A which typically absorbs transverse deflection which may be otherwise applied to the FDGS 60. The static structure 36 may further include a number 1 and 1.5 bearing support static structure 82 which is commonly referred to as a "K-frame" which supports the number 1 and number 1.5 bearing systems 38A, 38B. Notably, the K-frame bearing support defines a lateral stiffness as the referenced factor in this non-limiting embodiment.

In this disclosed non-limiting embodiment, the lateral stiffness (KFS; KIC) of both the flexible support 78 and the input coupling 62 are each less than about 11% of the lateral stiffness (Kframe). That is, the lateral stiffness of the entire FDGS 60 is controlled by this relationship.

Figure 4:
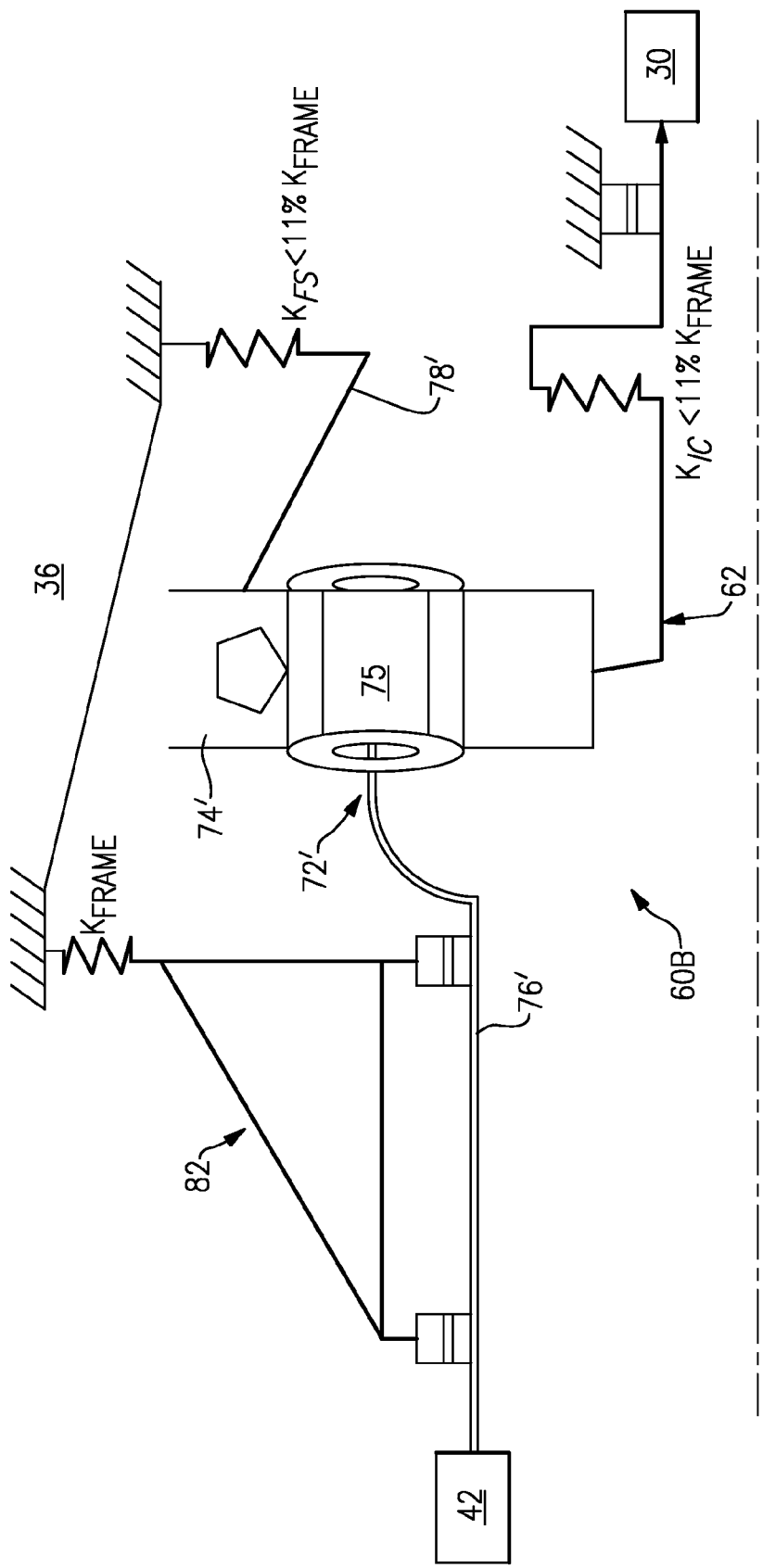
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
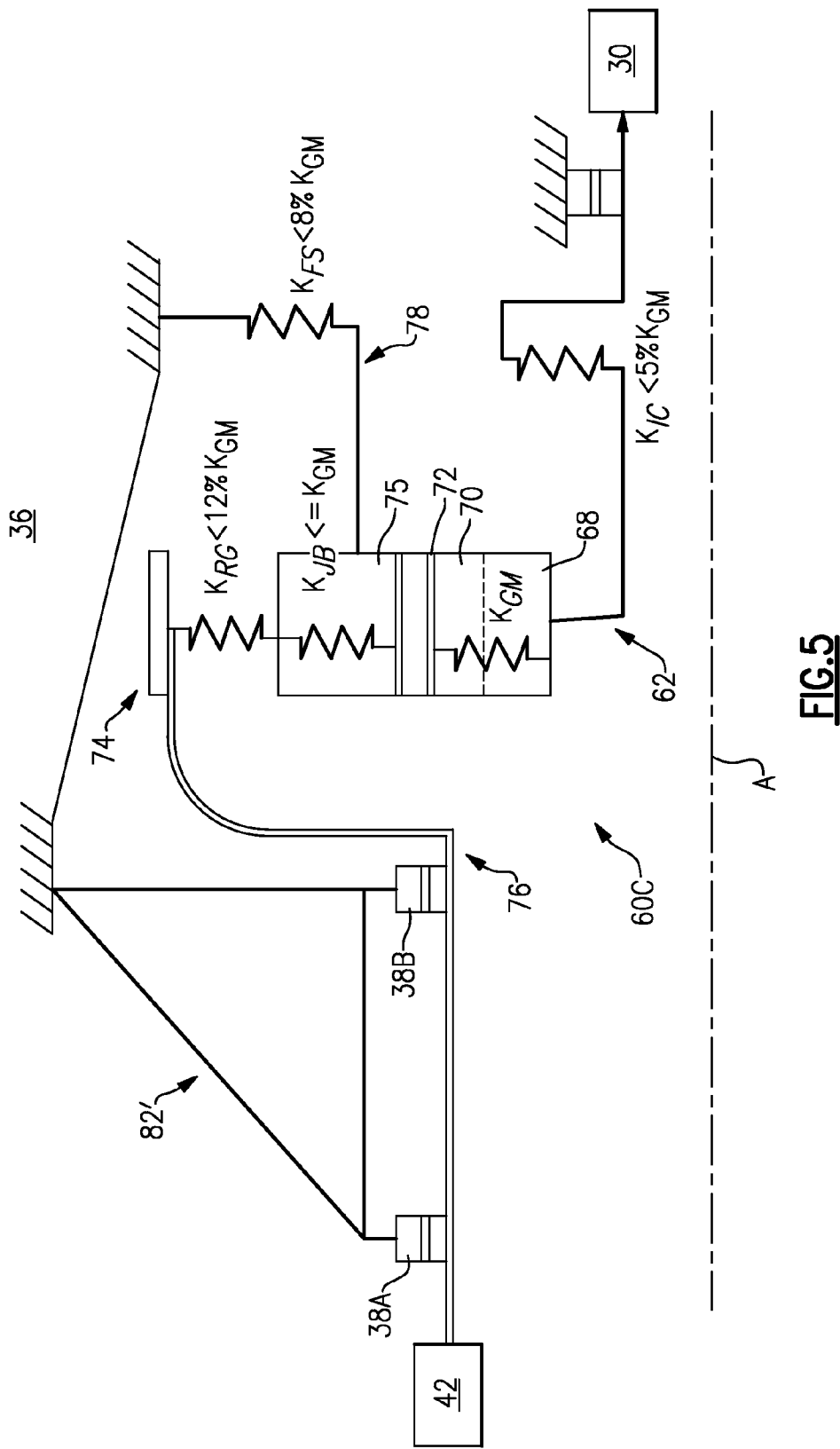
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A geared architecture for a gas turbine engine comprising:
    a fan shaft;
    a frame which supports said fan shaft, said frame defines a frame lateral stiffness;
    a gear system which drives said fan shaft;
    a flexible support which at least partially supports said gear system, said flexible support defines a flexible support lateral stiffness with respect to said frame lateral stiffness; and
    an input coupling to said gear system, said input coupling defines an input coupling lateral stiffness with respect to said frame lateral stiffness.

2. The geared architecture as recited in claim 1, wherein said frame and said flexible support are mounted to a static structure.

3. The geared architecture as recited in claim 1, wherein said frame and said flexible support are mounted to a static structure of a gas turbine engine.

4. The geared architecture as recited in claim 1, wherein said frame and said flexible support are mounted to a front center body of a gas turbine engine.

5. The geared architecture as recited in claim 1, wherein said flexible support is mounted to a planet carrier of said gear system.

6. The geared architecture as recited in claim 5, wherein said input coupling is mounted to a sun gear of said gear system.

7. The geared architecture as recited in claim 6, wherein said fan shaft is mounted to a ring gear of said gear system.

8. The geared architecture as recited in claim 7, wherein said gear system is a star system.

9. The geared architecture as recited in claim 1, wherein said flexible support is mounted to a ring gear of said gear system.

10. The geared architecture as recited in claim 9, wherein said input coupling is mounted to a sun gear of said gear system.

11. The geared architecture as recited in claim 10, wherein said fan shaft is mounted to a planet carrier of said gear system.

12. The geared architecture as recited in claim 11, wherein said gear system is a planet system.

13. The geared architecture as recited in claim 1, further comprising a low speed spool which drives said input coupling.

14. The geared architecture as recited in claim 1, wherein at least one of said flexible support lateral stiffness and said input coupling lateral stiffness are less than about 20% of said frame lateral stiffness.

15. The geared architecture as recited in claim 1, wherein said flexible support lateral stiffness and said input coupling lateral stiffness are each less than about 20% of said frame lateral stiffness.

16. The geared architecture as recited in claim 1, wherein at least one of said flexible support lateral stiffness and said input coupling lateral stiffness are less than about 11% of said frame lateral stiffness.

17. The geared architecture as recited in claim 1, wherein said flexible support lateral stiffness and said input coupling lateral stiffness are each less than about 11% of said frame lateral stiffness.

18. The geared architecture as recited in claim 1, wherein said frame which supports said fan shaft and defines said frame lateral stiffness is a K-frame bearing support, said K-frame bearing support supporting a bearing system that supports said fan shaft.

19. A geared architecture for a gas turbine engine comprising:
   a fan shaft;
   a frame which supports said fan shaft;
   a gear system which drives said fan shaft, said gear system includes a gear mesh that defines a gear mesh;
   a flexible support which at least partially supports said gear system, said flexible support defines a flexible support lateral stiffness with respect to said gear mesh lateral stiffness; and
   an input coupling to said gear system, said input coupling defines an input coupling lateral stiffness with respect to said gear mesh lateral stiffness.

20. The geared architecture as recited in claim 19, wherein said flexible support lateral stiffness is less than about 8% of said gear mesh lateral stiffness.

21. The geared architecture as recited in claim 19, wherein said input coupling lateral stiffness is less than about 5% of said gear mesh lateral stiffness.

22. The geared architecture as recited in claim 19, wherein a lateral stiffness of a ring gear of said gear system is less than about 20% of said gear mesh lateral stiffness.

23. The geared architecture as recited in claim 19, wherein a lateral stiffness of a ring gear of said gear system is less than about 12% of said gear mesh lateral stiffness.

24. The geared architecture as recited in claim 19, wherein a lateral stiffness of a planet journal bearing which supports a planet gear of said gear system is less than or equal to said gear mesh lateral stiffness.

25. The geared architecture as recited in claim 19, wherein said gear mesh lateral stiffness (KGM) is defined between a sun gear and a multiple planet gears of said gear system.

26. The geared architecture as recited in claim 19, wherein said gear system floats with said fan shaft.

27. The geared architecture as recited in claim 19, wherein a planet journal bearing which supports a planet gear of said gear system defines a lateral stiffness with respect to said gear mesh lateral stiffness.

28. The geared architecture as recited in claim 19, wherein a ring gear of said gear system defines a lateral stiffness with respect to said gear mesh lateral stiffness.

* * * * *

UNITED STATES PATENT AND TRADEMARK OFFICE
CERTIFICATE OF CORRECTION

PATENT NO. : 8,297,916 B1  
APPLICATION NO. : 13/342508  
DATED : October 30, 2012  
INVENTOR(S) : McCune et al.

Page 1 of 1

It is certified that error appears in the above-identified patent and that said Letters Patent is hereby corrected as shown below:

Claim 19, Column 7, line 29: after the second occurrence of "gear mesh" insert --lateral stiffness--

Signed and Sealed this  
Twenty-second Day of January, 2013

David J. Kappos  
*Director of the United States Patent and Trademark Office*